March 5, 1935.  A. H. MEARS ET AL  1,993,527

FLUID MEASURING SYSTEM

Filed June 30, 1931  3 Sheets-Sheet 1

Inventors
Atherton H. Mears
and Benjamin J. Wilson
By Cornelius L. Ehret
their Attorney.

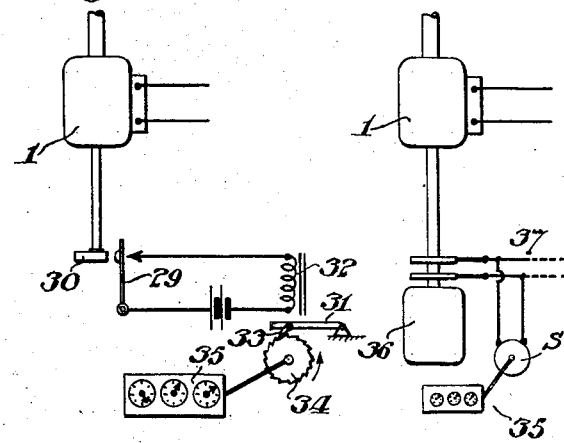
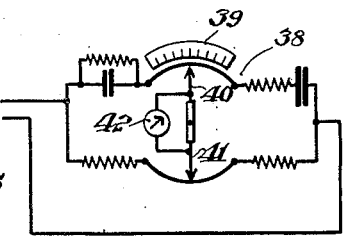
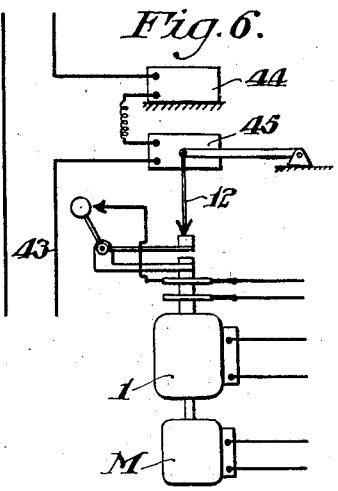
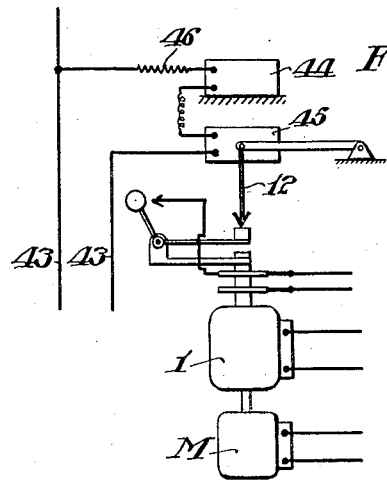

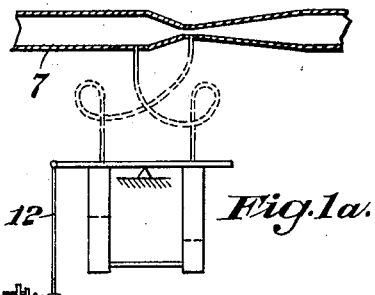
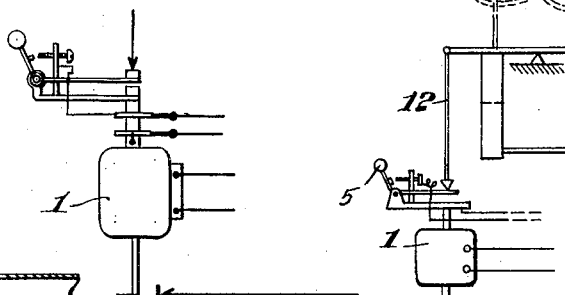
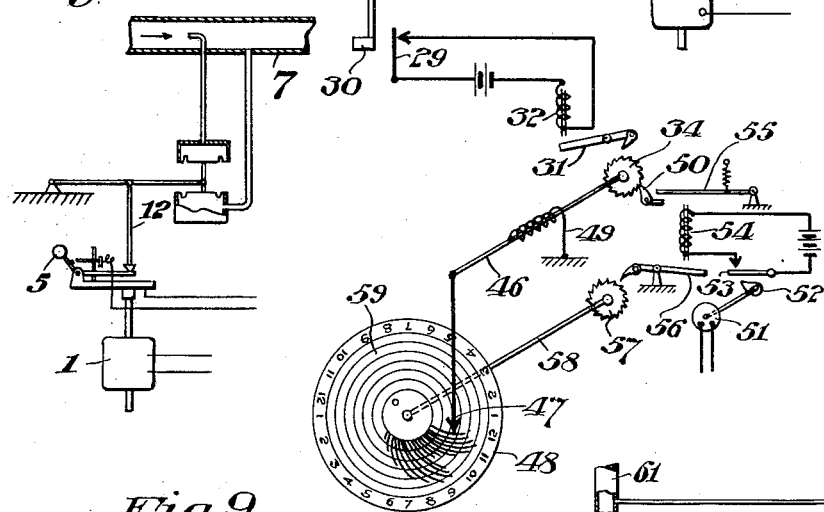
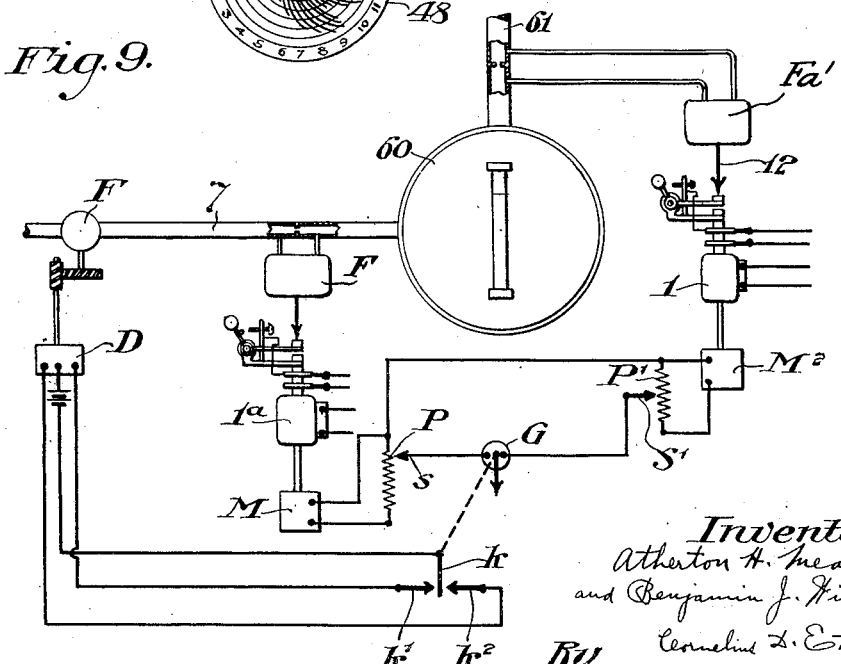

Patented Mar. 5, 1935

1,993,527

UNITED STATES PATENT OFFICE 1,993,527

FLUID MEASURING SYSTEM

Atherton H. Mears and Benjamin J. Wilson, Philadelphia, Pa., assignors to Leeds & Northrup Company, Philadelphia, Pa., a corporation of Pennsylvania Application June 30, 1931, Serial No. 548,052

29 Claims. (Cl. 73—167)

Our invention relates to apparatus for measuring, indicating, recording, integrating, or controlling conditions or variations in conditions, as physical, electrical, and other conditions, and more particularly rate of flow of fluid and variations in rate of flow.

In accordance with our invention, the force acting in the governor of a motor is balanced against a force whose magnitude is determined by the magnitude of the condition under measurement, for example against a differential pressure produced by flow of fluid, in order that the speed of the motor shall have a predetermined value for each rate of flow, and more specifically, that the motor speed shall be a linear function of the rate of flow, or other condition under measurement.

Our invention also resides in the systems and features of combination hereinafter described and claimed.

For an understanding of our invention, and for illustration of some of the forms it may take, reference is to be had to the accompanying drawings in which:

Figs. 1a and 1b show alternative flow responsive devices useful in connection with my invention.

Fig. 4 is a further modification for integrating adapted to be included in the system of Fig. 1.

Fig. 5 is an electrical system utilizing alternating current for measuring or integrating which is adapted to be used with the system shown in Fig. 1.

Figs. 6 and 7 are further modifications of our invention for measuring electrical current, and voltage respectively.

Fig. 8 diagrammatically illustrates a modification of our invention for determining flow demand.

Fig. 9 illustrates a boiler feed-water control system utilizing our invention.

Figure 1:
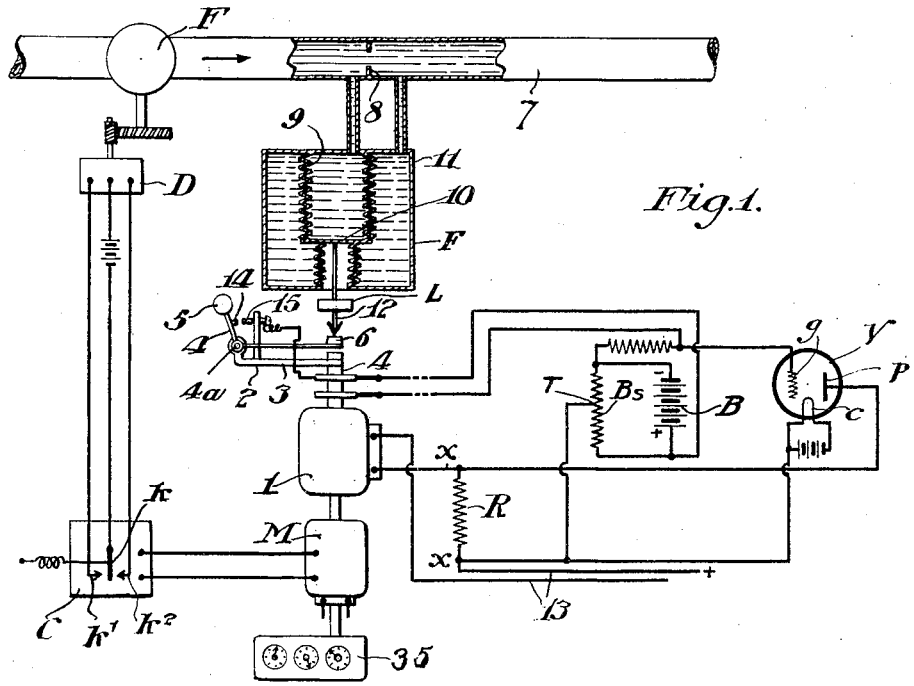
Fig. 1 illustrates diagrammatically a system for measuring and controlling the rate of flow of a fluid.

Referring to Fig. 1 which illustrates one embodiment of our invention, the motor 1 drives a governor 2 consisting of a frame 3 which is mounted on and rotatable with the shaft of the motor. The bell-crank 4 which is pivotally mounted on the supporting member 3 is provided with a ball or weight 5 which under the influence of centrifugal force tends to rotate the bell-crank in counter-clockwise direction, as viewed in Fig. 1, about its pivot 4a; i. e. to increase the diameter of the circular path of weight 5.

At its other end, the bell crank is provided with a bearing plate or member 6 which lies substantially in the axis of rotation of the motor shaft. The governor described is selected for explanation of the principles underlying our invention because of its simplicity. The governor mechanism may actually be of any suitable type whose loading may be varied during rotation of motor shaft 4.

The flow of fluid through the pipe 7 produces on opposite sides of the orifice plate 8 a differential pressure which is a function of the rate of flow of fluid. On the up-stream side of the orifice plate, the pipe 7 is in communication with the interior of a collapsible bellows 9 provided at its lower end with a substantially rigid plate 10. The interior of the casing 11 of the flow responsive device which surrounds bellows 9 is in communication with pipe 7 on the down-stream side of the orifice. Accordingly, the plate 10 is subjected to a force tending to move it downwardly which corresponds to the difference between the pressures on the up-stream and down-stream sides of orifice 8.

The rod 12 connected to the plate 10 and bearing on the button or member 6 of the governor member 4, transmits thereto a force whose magnitude is determined by the rate of flow of fluid through pipe 7, and which tends to produce clockwise rotation of the crank-arm 4 about its pivot 4a, as viewed in Fig. 1, i. e., to decrease the diameter of the circular path of weight 5, and so opposes the centrifugal force which tends to effect rotation of the crank-arm in opposite direction, as above described.

It will be understood that although a collapsible bellows arrangement has been shown as the means for obtaining a biasing force which varies with rate of flow of fluid, that a manometer tube (Fig. 1a), diaphragms (Fig. 1b), or other devices may be used to apply to the governor the pressure differential or other force varying with fluid flow. Further it will also be understood that the pressure differential need not be obtained by use of an orifice plate, for example, a venturi (Fig. 1a), Pitot tube (Fig. 1b), or nozzle may be utilized, and for measurement of other conditions, the type of primary element chosen will depend upon the nature or characteristics of the conditions. The secondary element or governor, and the primary element, or differential pressure device in the system specifically illustrated, is so designed that the opposing forces acting on the governor are balanced at a desired speed for a given rate of flow, and by action of the governor the motor speed is varied to maintain the balance for different rates of flow.

The flow of fluid through an orifice such as provided by plate 8 or equivalent, varies substantially as the square root of the difference in pressure on opposite sides of the plate, or the differential pressure across the orifice. Accordingly, the force transmitted by the rod 12, or equivalent, which opposes the centrifugal force acting on the governor, varies substantially as the square of the rate of the flow of fluid through pipe 7.

The centrifugal force tending to effect counterclockwise rotation of the weight 5 varies substantially as the square of the angular velocity or speed, of the governor about its axis of rotation. Accordingly, the opposing forces acting on the governor follow the same square law variation and when maintained in equilibrium, the motor speed is directly proportional to the rate of flow. The governor, in any suitable and known manner, controls the speed of the motor to maintain these forces in balance, and therefore the speed of the motor corresponds at all times, to the rate of flow of fluid through conduit 7 and is a linear function of the rate of flow.

In the system which is specifically illustrated the governor is driven by an electrical motor, and controls the speed of the motor by varying the effective resistance between the points $x$, $x$ of its energizing circuit 13. Specifically when the contact 14, movable with or actuated by the centrifugal structure of the governor, is in engagement with a fixed contact 15, which in the governor specifically illustrated, is mounted upon the supporting structure 3 of the governor, the bias of the grid $g$ of the tube V is modified, made more positive, to effect low internal resistance of the tube, that is, low resistance of the path interiorly of the tube between the plate $p$ and the cathode $c$. Specifically, with contacts 14, 15 in closed position the grid $g$ is connected to the lower terminal of battery B which is positive with respect to cathode $c$ and to an extent determined by the position of tap T of the battery shunting resistance $B_s$. This in effect, reduces the value of a resistance, the anode-cathode resistance of tube V, in shunt to the resistance R, and so increases the speed of the motor.

When the motor speed is such that the contacts separate, that is when the centrifugal force overbalances that exerted by rod 12, the grid $g$ is more negatively biased to increase the plate-cathode resistance of the tube, thus reducing the supply of current to motor 1 and its speed. Specifically, when the contacts 14, 15 are open, the grid is at the potential of the upper terminal of battery B which is negative with respect to cathode and to suitable extent determined by the position of tap T.

Other methods and arrangements for controlling the speed of the motor may be used. Irrespective of the particular arrangement used, the speed of the motor, whether electric or otherwise, is controlled by the governor to maintain the forces in balanced condition. With the forces acting on the governor in equilibrium, the motor will have a definite speed for each rate of flow, and in the system illustrated this relation is maintained even though there may occur substantial variation in the voltage of the supply line 13 to the motor, for example, variations as great as 20% do not appreciably affect the speed independently of rate of flow. In practice, the speed of the motor has accurately indicated rate of flow through a range of as great as 10 to 1 ratio between the minimum and maximum rates of flow. If desired, a switch may be included in the motor circuit to open it when the flow becomes zero or some predetermined minimum and to reclose it when the flow again exceeds the minimum.

Figure 1C:
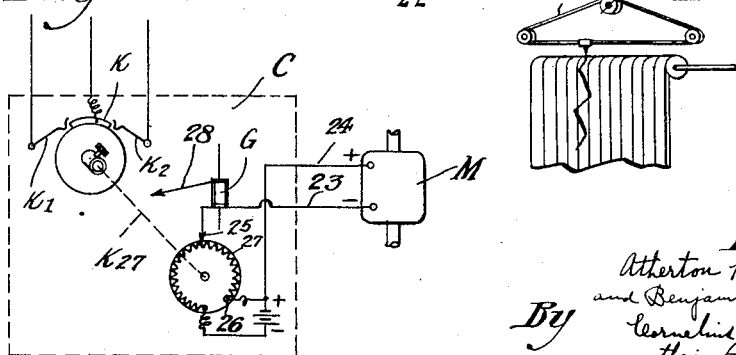
Fig. 1c illustrates one form which the controller C of Fig. 1 may take.

The speed of the motor may be utilized to indicate, record or control the rate of flow in many different ways. For example, the measuring device M associated with the shaft of motor 1, may be an ordinary tachometer calibrated in units of flow, or it may be a revolution counting device 35 calibrated in units of flow for integrating the flow through pipe 7. To control flow, the device M, an electric generator the voltage or frequency of which varies linearly with the instantaneous rate of flow in the conduit 7 as, for example, in the arrangements of Figs. 3, 5, 6, 7 and 9, may be connected to a controller C, whose contacts $k$, $k1$, and $k2$ control the energization and direction of rotation of a motor D for changing the setting of valve F to maintain constant flow. More specifically, the device M may be a direct-current magneto, as in the modification of Fig. 3, and the controller may be similar to that of Leeds Patent 1,125,699 and Wunsch Patent 1,751,538 (Fig. 2), hereinafter referred to. The controller C, may be, as shown in Fig. 1c, a self-balancing potentiometer of the aforesaid type, the deflection of the galvanometer G, when the potentials of M and the potentiometer network are unbalanced, effecting change in the slide wire setting in the well-known manner, and effecting engagement between contact $k$ and either of contacts $k1$ or $k2$ depending upon the sense of the deflection. To change the rate of flow from desired value to another desired value, the movable contact of the controller may be angularly shifted on its shaft $k27$, or the fixed contacts shifted about the axis of the movable contact, so that the movable contact is out of engagement with the fixed contacts for the new rate of flow, etc.; alternatively, the normal loading force exerted by element 12, or equivalent, may be adjusted in any suitable manner as for example, by addition or removal of a calibrated weight L.

Figure 2:
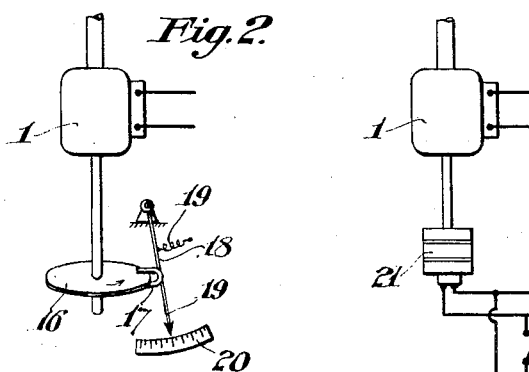
Fig. 2 illustrates a specific type of indicating mechanism which may be included in the system of Fig. 1.

Further, as shown in Fig. 2, a disc of suitable nonmagnetic metal may be secured to the shaft of motor 1 for rotation therewith. The poles of a magnet 17 mounted upon a pivoted member 18, embrace the periphery of the disc. By reaction between the currents induced in disc 16 by magnet 17, and the field of the magnet, the latter is moved in opposition to spring 19 by a force which is substantially a linear function of the motor speed. The scale 20 therefore with which the pointer 9 cooperates may be uniformly graduated in units of flow. The showing of Fig. 2 is diagrammatic and it is to be understood that the indicating apparatus, as made, though fundamentally similar to Fig. 2, will differ therefrom in constructional details.

Figure 3:
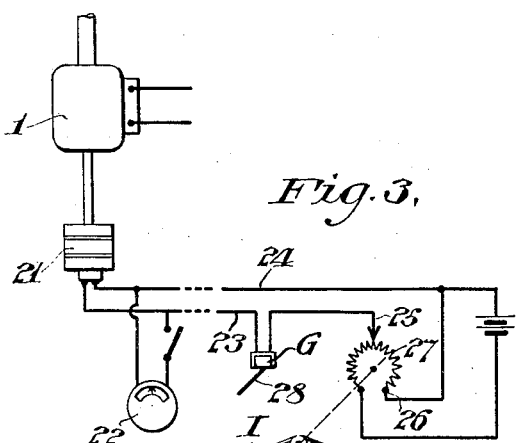
Fig. 3 illustrates an electrical arrangement for indicating and recording adapted to be included in the system shown in Fig. 1.

In Fig. 3 the motor 1 drives a direct-current magneto 21, and since the speed of the motor is directly proportional to rate of flow, the voltage delivered by the magneto is a linear function of rate of flow. Accordingly the scale of a volt meter 22 adapted to be connected to the magneto may be provided with a linear, or uniformly divided scale, in units of flow. By utilizing a potentiometer network with the system of Fig. 3, the readings of rate of flow may be taken or recorded at any desired remote point from the primary and secondary elements of the system. For example, the conductors 23, 24 may extend from the magneto 21 to the slide wire contact 25 and a terminal 26 of a potentiometer resistance 27. When the potential developed by the magneto is equal to the voltage drop between the slide wire contact and the terminal 26 of resistance 27, the needle 28 of the galvanometer G is stationary. When the potentials are not balanced, the needle deflects in one direction or the other to operate an indicating or recording apparatus I, similar for example, to that disclosed in Leeds Patent 1,125,- 699. The potentiometer apparatus is self-balancing in that relative movement of the slide wire contact 25 and slide wire 27 is effected during the recording to re-balance the potentials.

Another flow integrating arrangement is shown in Fig. 4, in which the switch 29 is operated by rotation of the motor shaft; for example, cam 30 at the end of the motor shaft closes the circuit through the switch 29 for each revolution, or any desired number of revolutions, of the motor shaft. Each time the circuit is closed, the armature 31 is attracted by electromagnet or solenoid 32 and upon de-energization, the pawl 33 moves a rachet wheel 34 connected to a suitable integrating device 35, through a definite angle of movement. As the speed of the motor 1 is a linear function of rate of flow, the number of revolutions varies directly as the total flow and accordingly the integrating device may consist of an ordinary gear train or Geneva gears provided with pointers and scales in the usual manner. The integrating device and its actuating mechanism may, if desired, be disposed remote from the primary and secondary elements of the system.

In the arrangement shown in Fig. 5, a motor 1 drives a small alternator 36, whose frequency will vary directly with rate of flow, since the speed of motor 1 is a linear function of rate of flow. For integration of flow, any suitable integrating device 35, graduated in units of flow, is connected to a synchronous motor S energized from the line 37 supplied by the generator 36. The integrating apparatus may be at any distance from the measuring point since the frequency of the current, unlike its voltage, is the same regardless of the length of the transmission line. Further, the rate of flow may be recorded or indicated, by apparatus similar to that disclosed and claimed in Wunsch Patent No. 1,751,538, which utilizes a balanceable frequency responsive network similar to network 38, Fig. 5. The scale or recorder chart 39 associated with the apparatus is linear or uniformly graduated in units of rate of flow or related units. Briefly, change in rate of flow causes a change in frequency of the current generated by the alternator, upsetting the balance of the network 38. The slide wire contacts 40, 41 of the bridge are adjusted until the deflection of galvanometer 42 is restored to zero. The scale, or pointer and chart, then indicates the changed value of the rate of flow. In the Wunsch apparatus aforesaid, the network is self-balancing and the recorder pen moves simultaneously with the slide wire contacts to trace a record. The frequency responsive network may be disposed at any distance from the measuring station without impairing the accuracy of the readings.

While our apparatus are particularly useful in the measurement of flow of fluid, they may be utilized for other measurements by suitable selection of the primary element. For example, in Fig. 6 the speed of the motor 1 is a linear function of the current flowing through the conductor 43, since the current flowing through the fixed coil 44 and movable coil 45 produces a force transmitted by rod 12, which varies as the square of the current. This force is balanced against the centrifugal force acting on the governor which varies, as previously pointed out, with the square of the speed of motor 1. The arrangement shown in Fig. 7 is similar to that shown in Fig. 6 except that the coils 44 and 45 are connected across the line 43, 43 in series with a suitable resistance 46. In this modification the force transmitted by rod 12 varies with the square of the voltage difference between conductors 43, 43, and the speed of motor 1 is a linear function of voltage. In both Figs. 6 and 7 the measuring device M generically represents any suitable measuring, indicating, or recording apparatus, such as for example, those illustrated in the preceding modification, or suitable means, as an alternator, for permitting indicating or recording at a remote point.

In Fig. 8, is shown a modification of our invention for measuring flow demand. As in the system of Fig. 4, a cam 30 driven by the motor 1 intermittently closes a circuit at intervals determined by the rate of flow of fluid to energize a coil 32. A pawl carried by the armature 31 of the coil engages the rachet wheel 34 which, in this modification effects rotation of a shaft 46 for moving a recorder stylus or marker 47 cooperating with the recorder disk or chart 48. The spring 49, one end of which is secured to shaft 46 and the other end of which is secured to a fixed point, biases or constantly tends to return the recorder stylus to the zero line of the chart, and is tensioned by rotation of shaft 46 as effected by the stepping mechanism.

Periodically, at time intervals of desired length, the locking pawl 50 of ratchet wheel 34 is released, permitting the spring 49 to return the recorder stylus to the zero line of disk 48, and substantially simultaneously the disk is advanced a suitably small amount. Specifically, a constant speed device 51, as a chronometer, or a synchronous motor, drives the cam 52 which periodically at the desired interval, actuates the movable contact 53 to energize coil 54 which attracts armature 55 momentarily to release the locking pawl 50 for the purpose previously stated. A second armature 56 attracted by coil 54 advances the ratchet wheel 57 suitably connected, as by shaft 58, to the recorder chart 48.

Each of the lines drawn by the recorder pen 47 outwardly from the zero line represents the integrated flow for the time between two successive energizations of coil 54. The length of each line therefore represents the integrated flow for an interval of definite length, and at a particular time of the day, when the chart 48 is, as usual, suitably divided in units of time and provided as indicated, with a time scale. The area between the zero line and a line connecting the peaks of the lines drawn by the recorder pen represents the total flow, and the outline formed by the outer tips of the individual lines indicates the varying flow demand throughout the day. The radial distances between the circles 59 which constitute the flow scale of the recorder disk are such that they subtend equal angles of the movement of the recorder pen 47 which is proportional to the rate of flow.

In the modification shown in Fig. 9, our invention is utilized to proportion the rate of flow of feed water of a boiler to the steam demand upon the boiler. A suitable flow responsive device Fa', similar for example to that shown in Fig. 1, produces a pressure differential which varies non-linearly with the rate of flow of steam from the boiler 60 through the pipe 61. As the rate of flow of steam varies, the speed of motor 1 is controlled as previously described, by a governor so that the speed of motor 1 is at all times directly proportional to the rate of flow of steam. Accordingly, the difference of potential between the terminals of a potentiometer resistance P1 connected to the terminals of generator M2 driven by the motor 1, varies linearly with rate of flow of steam.

By a similar system, the difference of potential between the terminals of a second potentiometer resistance P varies linearly with rate of flow of feed water through the pipe 7 to the boiler 60. Either or both of the potentiometer resistances P, P1, may be provided with a movable contact, as contacts S, S1, to predetermine the desired ratio of rate of flow of steam to the rate of flow of feed water.

Assuming there is a change in the load demand upon the boiler 60, the rate of flow of steam changes effecting a change in the difference of potential between the terminals of the potentiometer resistance P1. This upsets the balance of the two potentiometers and current flows through the galvanometer G which deflects to cause engagement of contact $k$ with one or the other of fixed contacts $k1$, $k2$. The motor D for changing the setting of the valve F in the feed water line, is thus energized, and in proper sense. Assuming that the load demand increases, the motor is energized to rotate in such direction that the feed water valve is opened to increase the rate of flow of feed water. The valve continues to open until the speed of the generator M, which is a linear function of the rate of flow of feed water, is increased to such extent that the potentiometers are again balanced, whereupon the galvanometer G effects disengagement of the movable contact $k$ to interrupt the motor circuit.

Preferably, the arrangement or mechanism for controlling the circuit of motor D upon unbalance of the two potentiometers is similar to that disclosed in Brewer Patent 1,356,804, although it will be understood that other arrangements may be utilized.

To maintain the level of water within the boiler 60 at any desired height, it may be necessary to change slightly the position of one of the contacts of the potentiometers. This may be effected manually or automatically by a liquid level responsive device.

For brevity in the appended claims, the term "measuring" is used generically to comprehend indicating, recording, and integrating, unless this interpretation is inconsistent with the claim language.

What we claim as our invention is:

1. A measuring system comprising a motor, means including a centrifugal governor controlling the speed of said motor, means for varying the governor bias proportionally to the square of the rate of flow of a fluid whereby the speed of the motor varies with said flow, and indicating means controlled by said motor.

2. A system comprising a motor, means including a centrifugal governor controlling the speed of said motor, means for varying the governor bias proportionally to the square of the rate of flow of a fluid, and measuring means actuated in accordance with the speed of said motor and having a scale graduated proportional to units of measurement of flow.

3. A system comprising a motor, a centrifugal governor controlling the speed of said motor, means for varying the governor bias as a predetermined function of the magnitude of a condition, and an electrical measuring system responsive to the speed of said motor for measuring said condition.

4. A system comprising a motor, a centrifugal governor controlling the speed of said motor, means for varying the governor bias as a predetermined function of the magnitude of a condition, an alternator driven by said motor, a synchronous motor electrically driven by said alternator, and an integrating device actuated by said synchronous motor.

5. A system comprising a motor, a centrifugal governor controlling the speed of said motor, means for varying the governor bias as a predetermined function of the magnitude of a condition, an alternator driven by said motor, a frequency-responsive network connected to said alternator, and a movable member associated with said network and cooperating with a scale graduated proportionally to units of measurement of said condition.

6. A system for measuring the rate of flow of a fluid comprising means producing a force varying substantially as the second power of the rate of flow of said fluid, a motor, means including a centrifugal governor for controlling the speed of said motor, means for transmitting said force to bias said governor, an alternator driven by said motor, and means responsive to the frequency of current generated by said alternator having a scale uniformly graduated in units of rate of flow.

7. A system for measuring the rate of flow of a fluid comprising means producing a force varying substantially as the second power of the rate of flow of said fluid, a motor, means including a centrifugal governor for controlling the speed of said motor, means for transmitting said force to bias said governor, an alternator driven by said motor, a synchronous motor connected to said alternator, and a flow integrating device driven by said motor.

8. A measuring system comprising a motor, means for controlling the speed of said motor including a flyball governor, structure subjected to a force substantially proportional to the square of the rate of flow of a fluid for opposing the centrifugal force of said governor, and flow-indicating means responsive to the revolutions of said motor.

9. A measuring system comprising a motor, means for controlling said motor including a flyball governor driven thereby, structure subjected to a force substantially proportional to the square of the rate of flow of fluid for opposing the centrifugal force of said governor, and flow-indicating means responsive to the revolutions of said governor.

10. A measuring system comprising a motor, means for controlling the speed of said motor including a flyball governor, structure subjected to a force substantially proportional to the square of the rate of flow of a fluid for opposing the centrifugal force of said governor, and means responsive to the speed of said motor for indicating the rate of flow of the fluid.

11. A measuring system comprising a motor, means for controlling the speed of said motor including a flyball governor, structure subjected to a force substantially proportional to the square of the rate of flow of a fluid for opposing the centrifugal force of said governor, and means responsive to the speed of said governor for indicating the rate of flow of the fluid.

12. A measuring system comprising a motor, means for controlling the speed of said motor including a flyball governor, structure subjected to a force substantially proportional to the square of the rate of flow of a fluid for opposing the centrifugal force of said governor, and means for integrating the revolutions of the motor to indicate integrated flow of the fluid.

13. A measuring system comprising a motor, means for controlling the speed of said motor including a flyball governor, structure subjected to a force substantially proportional to the square of the rate of flow of a fluid for opposing the centrifugal force of said governor, and means for integrating the revolutions of the governor to indicate integrated flow of the fluid.

14. A flow measuring system comprising a differential-pressure device subjected to pressures whose difference is substantially proportional to the square of the rate of flow of a fluid, a motor, means for controlling said motor including a flyball governor driven thereby, structure connecting said differential-pressure device to said governor for varying the loading thereof upon change in the rate of flow of said fluid, and flow-indicating means responsive to the revolutions of said motor.

15. A flow-measuring system comprising a motor flow indicating means responsive to the revolutions of said motor, and means for controlling the speed of said motor comprising a centrifugal governor, a differential-pressure device subjected to pressures whose difference is a measure of the rate of flow of a fluid, and means including said device for varying the loading of said governor.

16. A flow measuring system comprising a pressure-differential device subjected to pressures whose difference is substantially proportional to the square of the rate of flow of a fluid, a motor, means including a flyball governor for controlling the speed of said motor, whose settings are determined by said pressure-differential device, and flow integrating means comprising a device driven by said motor.

17. A flow measuring system comprising a pressure-differential device subjected to pressures whose difference is substantially proportional to the square of the rate of flow of a fluid, a motor, means including a centrifugal governor for controlling the speed of said motor, whose settings are determined by said pressure-differential device, and an electrical system comprising a device driven by said motor, and an electrical measuring instrument in circuit with said device.

18. A flow measuring system comprising a pressure-differential device subjected to pressures whose difference is a measure of rate of flow of a fluid, a motor, means including a centrifugal governor for controlling the speed of said motor, whose settings are determined by said pressure-differential device, and an electrical system comprising a device driven by said motor and an electrical measuring instrument in circuit with said device for integrating its speed.

19. A flow measuring system comprising a pressure-differential device subjected to pressures whose difference is substantially proportional to the square of the rate of flow of a fluid, a motor, means including a centrifugal governor for controlling the speed of said motor, whose settings are determined by said pressure-differential device, an electrical generating device driven by said motor, and a potentiometer-recorder in circuit with said device.

20. A flow measuring system comprising a pressure-differential device subjected to pressures whose difference is substantially proportional to the square of the rate of flow of a fluid, a motor, means including a centrifugal governor for controlling the speed of said motor, whose settings are determined by said pressure-differential device, and an electrical system comprising switching means periodically operated by said motor and electromagnetic stepping mechanism in circuit with said switching means.

21. In a meter the combination of a bearing, a rotatable member mounted upon the bearing, means for producing a torque adapted to be applied to said member for rotating the same, a fly weight, means for mounting said fly weight upon said rotatable member whereby the fly weight will be movable radially of the axis of rotation of the rotatable member, control means mounted upon the fly weight and member and actuated by the radial movement of the fly weight upon said member for causing the torque produced by the first named means to rotate said member when the fly weight is moved toward the axis of rotation of said member and for reducing the torque when said weight is moved outwardly by centrifugal force, and a fluid pressure operated part operatively associated with the fly weight for applying a variable force to the latter for drawing the same inwardly toward said axis of rotation for actuating said control means for rotating said member at a speed proportional to the square root of the force applied by said part.

22. A meter for measuring the fluid flowing in a conduit comprising a differential pressure producing device mounted in said conduit, a casing, means connecting said casing to said device at points of different pressure, a differential fluid pressure responsive part within said casing and actuated by differential pressure produced by said device, a rotatable member, a motor for rotating said member, a fly weight, means for mounting said fly weight upon said member whereby the fly weight will be movable radially of the axis of rotation of said member, means for connecting the fly weight with said pressure responsive part, control means for governing the speed of the motor, and said control means having co-acting parts operatively mounted upon the fly weight and upon said member whereby an inward movement of the fly weight toward the axis of rotation of said member will increase the speed of the motor.

23. A meter for measuring the fluid flowing in a conduit, comprising a differential pressure producing device mounted in said conduit, a differential fluid pressure responsive device, means connecting said responsive device to said pressure producing device at points of different pressure, a rotatable member, means for supporting said member for rotation, a radially movable fly weight, means for mounting the fly weight upon said member whereby the weight will be movable radially of the axis of rotation of said member, means connecting said fly weight with said pressure responsive device for moving the weight toward the axis of rotation of said member, an electric motor and a circuit therefor, means operatively connecting the motor with said member for rotating the latter, an electric switch for controlling the motor circuit, said switch having one part mounted upon said weight and a second part mounted upon said member whereby the motor will be rotated at a speed proportional to the square root of the differential pressure within said pressure responsive device, a counting device, and means operatively connecting said counting device to said member for indicating the number of revolutions of the latter.

24. In a meter the combination of a bearing, a rotatable member mounted in the bearing, arms pivotally mounted upon said member and movable in a plane at right angles to the axis of rotation of said member, fly weights mounted upon said arms, a motor for rotating said member, an electric circuit including said motor, a switch contact point upon one of said arms, a switch contact point upon said member, said contact points included in the electric circuit for controlling the motor, and means operatively associated with the fly weights for applying a variable force to the latter for drawing the same inwardly toward the axis of rotation of said member.

25. A fluid meter comprising a first means for causing a differential pressure proportional to the square of the rate of flow of fluid, a second means responsive to the differential produced by said first means, a motor, a rotatable fly weight governor, means adapted to cause said motor to rotate said governor, said governor being adapted to exert a force on said second means in opposition to the force due to the differential pressure, means controlled jointly by said second means and said governor to vary the speed of said motor to balance said forces on the second means, and indicating means operatively connected to said governor and adapted to indicate the number of rotations of the governor.

26. A fluid flow measuring system comprising a rotatable element mounted with its center of gravity eccentric to its axis of rotation, means for rotating said element, means subjected to a force representative of the square of the rate of flow of a fluid and disposed to oppose said force to the centrifugal force developed by said rotatable element, means for controlling the speed of said rotatable element to maintain said forces in balance, and flow indicating means actuated in accordance with the rotation of said rotatable element.

27. A fluid flow measuring system comprising a rotatable element mounted with its center of gravity eccentric to its axis of rotation, means for rotating said element, means subjected to a force representative of the square of the rate of flow of a fluid and disposed to oppose said force to the centrifugal force developed by said rotatable element, means for controlling the speed of said rotatable element to maintain said forces in balance, means for generating an alternating current having a frequency varying linearly with the speed of said rotatable element, and flow indicating means energized by said alternating current.

28. A measuring system comprising a rotatable element mounted with its center of gravity eccentric to its axis of rotation, means for rotating said element, means subjected to a force varying as a predetermined function of the magnitude of a condition to be measured and disposed to oppose said force to the centrifugal force developed by said rotatable element, means for controlling the speed of said rotatable element to maintain said forces in balance, means for generating an alternating current having a frequency varying with the speed of said rotatable element, and an indicating device responsive to the frequency of said alternating current.

29. A measuring system comprising a rotatable element mounted with its center of gravity eccentric to its axis of rotation, means for rotating said element, means subjected to a force varying as a predetermined function of the magnitude of a condition to be measured and disposed to oppose said force to the centrifugal force developed by said rotatable element, means for controlling the speed of said rotatable element to maintain said forces in balance, means for generating an alternating current having a frequency varying with the speed of said rotatable element, and a synchronous integrating device energized by said alternating current.

ATHERTON H. MEARS.
BENJAMIN J. WILSON.